United States Patent [19]

Hörl

[11] Patent Number: 4,504,066

[45] Date of Patent: Mar. 12, 1985

[54] SEAL FOR TRACK CHAIN LINK OF TRACKED VEHICLES

[75] Inventor: Ernst Hörl, Freudental, Fed. Rep. of Germany

[73] Assignee: Parker-Hannifin Corporation, Cleveland, Ohio

[21] Appl. No.: 619,095

[22] Filed: Jun. 11, 1984

[30] Foreign Application Priority Data

Jun. 11, 1983 [DE] Fed. Rep. of Germany ....... 3321152

[51] Int. Cl.$^3$ .............................................. F16J 15/34
[52] U.S. Cl. ....................................... 277/84; 277/92; 277/95; 305/11
[58] Field of Search ........................ 277/84, 83, 92, 95, 277/81 R; 305/11-13

[56] References Cited

U.S. PATENT DOCUMENTS

| | | | |
|---|---|---|---|
| 2,614,006 | 10/1952 | Bechman | 305/11 X |
| 3,341,259 | 9/1967 | Schulz et al. | 305/11 |
| 4,094,516 | 6/1978 | Morley et al. | 305/11 X |
| 4,248,439 | 2/1981 | Haslett | 277/92 X |
| 4,331,339 | 5/1982 | Reinsma | 277/84 |

FOREIGN PATENT DOCUMENTS

2244408 3/1974 Fed. Rep. of Germany ........ 305/11

Primary Examiner—Robert S. Ward
Attorney, Agent, or Firm—Frederick L. Tolhurst

[57] ABSTRACT

In order, in such a seal, consisting of a softer solid ring (50) and a harder flange ring (52), to improve its springing distance and to prevent the passage of lubricant and/or dirt, it is proposed that the solid ring (50) be clamped axially between the bottom surface (36) of a depression (12) receiving the seal, in a chain sprocket (18), taking part in the forming of the link, and a flange ring (52) flange (64) lying against a sprocket end surface (42), lying opposite the bottom surface (36), which (64), lies broadly, by an end surface (68), divided by a ring groove (66), running around a link bolt (22), against the sprocket end surface (42); and that the solid ring (50) is supported radially outward by a flange ring (52) flange (62) lying against the ring-form boundary surface (40) of the depression (12), while the flange ring (52) has a substantially L-shaped profile and a slight distance from the bottom surface (36) of the depression (12), and occupies a pressure seating in the cylindrical boundary surface (40) of the depression (10).

4 Claims, 1 Drawing Figure

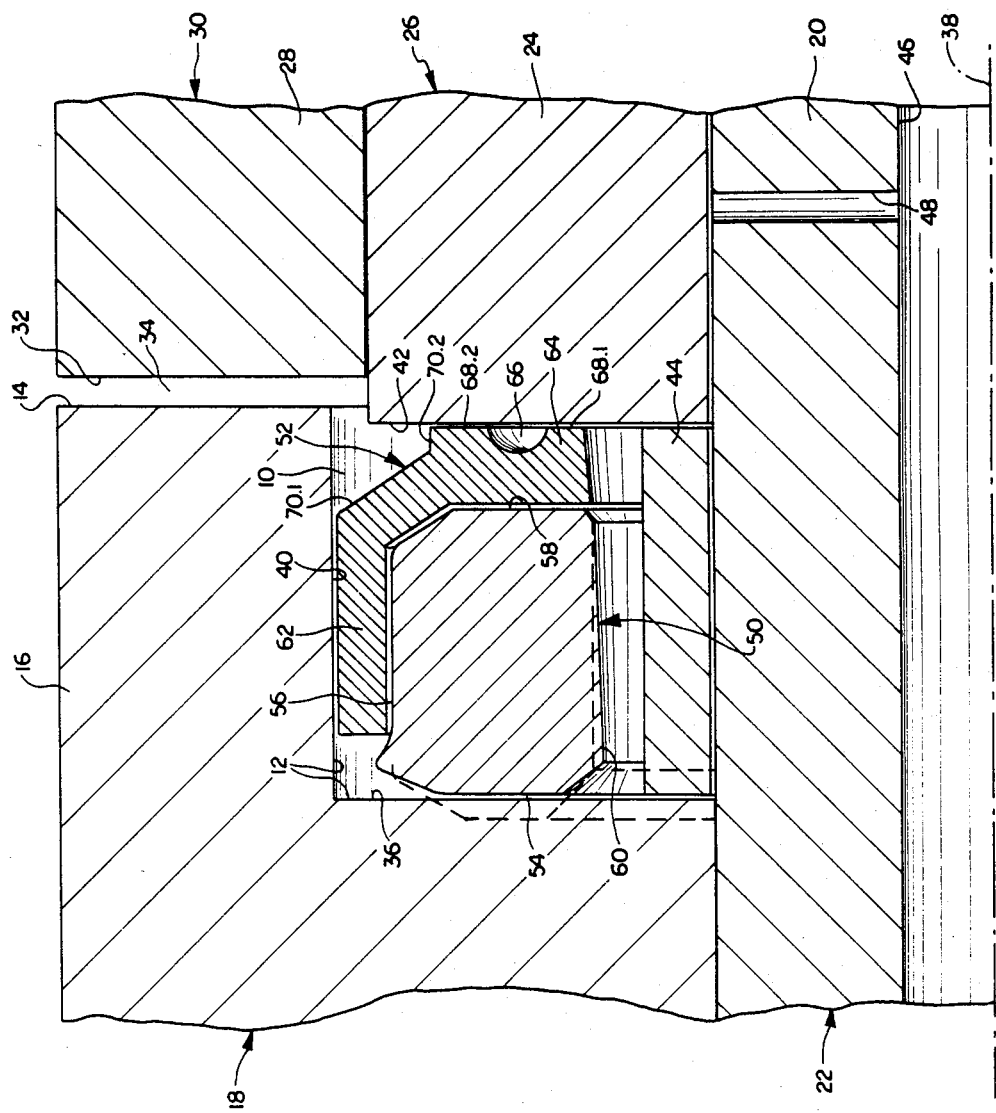

SEAL FOR TRACK CHAIN LINK OF TRACKED VEHICLES

BACKGROUND OF THE INVENTION

The invention concerns a seal (sealing ring) for track chain links on tracked vehicles, in which four chain sprockets, arranged in pairs side-by-side and overlapping in pairs, as well as chain socket, solidly joining the chain members lying axially outside in the overlapping zone and a coaxial bolt solidly joining the chain members lying axially inside in the overlapping zone, form a chain link which can be lubricated from a bore in the bolt which can be filled with lubricant, through a radial bore in the bolt, each sprocket lying outside, in the overlapping zone, having on its inner side a round cylindrical depression to receive the seal and a rigid distancing ring, sitting on the end of the bolt extending out of the socket, while the bottom surface of the depression, lying in one radial plane, lies opposite the end surface of the sprocket next to the depression, lying in a parallel plane, and the overlapping sprockets form a ring gap which opens the hollow space limited by the depression and the end surface lying axially opposite same; the seal, consisting of a softer solid ring, sealing statically against a boundary surface of the depression, and of a harder, more wear-resistant flange ring, which lies against the ring-form, coaxial boundary surface of the depression and seals dynamically against the end surface axially opposite the depression, with stress on the link while the flange ring supports the solid ring both axially and radially, and between each of these rings, on the one hand, and the distancing ring, on the other hand, a distance is present.

In the seals (sealing rings) of this kind known from German Pat. No. 2,205,533 and U.S. Pat. No. 3,336,086, the flange ring has a substantially U-shaped profile with substantially parallel legs, which are formed by two ring-form flanges, of which the axially inner has a circumferential sealing edge, which is deformed under axial pressure to a narrow, ring-form sealing surface, and by which the axially inner flange, after the installation of the flange ring, is pressed into the ring-form corner at the bottom of the depression receiving the seal. The profile yoke, joining the profile legs of the flange ring is formed by a narrow or broader radial inner ring, as the case may be, against which the flanges are formed and which is arranged between the solid ring, on the one hand, and the rigid distancing ring, on the other, which forms a loose individual part or a component part formed on the chain member lying axially inside in the zone of overlapping. The solid ring is situated between the two flanges of the flange ring, of which the ring groove formed by the flanges is completely or partly filled, and is therefore pressed by the flange ring against the ring-form coaxial boundary surface of the depression.

With the two known seals, the problem to be solved is to prevent, at the same time, the exit of lubricant through the ring gap in one direction, and the entrance of dirt through the ring gap in the other direction. But even with a linked connection of the two flanges of the flange ring and with a complete filling of the ring groove of the flange ring by means of the solid ring, it is a disadvantage that the dynamic sealing edge on the axial outer flange of the flange ring gives only a narrow sealing surface which is too small to be able to prevent satisfactorily the exit of lubricant and the entrance of dirt. Actually, it has been shown in seals of the kind mentioned, tested in practice, that grains, of sand, for example, which have migrated into the plastic material of the flange ring in the zone of the sealing surface, have become imbedded in this sealing surface and have damaged the adjacent part of the metal end surface lying opposite. It is also a disadvantage in the two known seals, that the size and shape of the cross-section area of the rubber elastic solid ring under load, and its arrangement, do not suffice to give the seal that axial elasticity which it needs in order to compensate tolerances in the production of the chain sprockets, to be sufficient for axial stresses in all cases, and to assure, through a flat spring curve, as constant as possible a pressure in the contact between the narrow sealing surface of the flange ring and the neighboring end surface of a chain sprocket.

The invention attacks, therefore, the problem of providing a seal for track chain links on tracked vehicles, without the said disadvantages which eliminates with certainty the said problem of substance exchange and improves the springing distance of the seal.

SUMMARY OF THE INVENTION

This problem is solved, according to the invention, in a seal of the kind mentioned, by the fact that the solid ring is clamped axially between the bottom surface of the depression and a flange ring flange lying against the sprocket end surface lying opposite the bottom surface, which (flange) lies broadly, by an end surface, divided by a ring groove running around the bolt, against the sprocket end surface, and that the solid ring is supported radially outward, by means of a flange ring flange lying against the ring form boundary surface of the depression, while the flange ring has a substantially L-shaped profile and a slight distance from the bottom surface of the depression, and occupies a pressure seating in the cylindrical boundary of the depression. By the fact of the widening of the dynamic sealing surface and its division by means of the ring groove provides a radially outer contact surface into which dirt can penetrate without danger of leakage, there is created, in the shape of the ring groove, a collection pool for dirt and/or a reservoir for lubricant, as well as a radially inner contact surface as the dynamic sealing surface itself, and the fact that, with elimination of the axially inner flange of the flange ring, there takes place an axial expansion of the solid ring to the bottom surface of the depression and the conversion of the radially inner ring of the flange ring into a radially outer ring increases the volume of the solid ring and, for the first time, brings the latter properly into place from which it has been hindered, up to now, by the eliminated flange of the flange ring.

In a preferred form of execution of the seal according to the invention, the profile of the solid ring is substantially a rectangle, of which the longer axis runs axis-parallel, so that the springing distance is directed mainly axis-parallel. In the preferred form of execution, the L-shaped flange ring, at the outer corner formed by its two flanges, is provided with an opening turned toward the ring gap so that dirt penetrating at this corner through the ring gap is not conducted to the sealing surface. Preferably, in this preferred form of execution, the outer and inner corners of the solid ring and the flange ring are each beveled or filled out, as the case may be, so that notching effects on the material cannot occur.

BRIEF DESCRIPTION OF THE DRAWING

In the following, the invention is explained in detail from the preferred form of execution, represented by way of example in the drawings, of the seal according to the invention, in combination with a schematic representation of its installation space. The single FIGURE of the drawing shows an axial longitudinal section through the seal, sitting in its installation space, in which the broken lines represent the profile of the relieved seal.

DESCRIPTION OF THE PREFERRED EMBODIMENT

The seal according to the invention is intended for installation in a circular ring-form hollow space, which corresponds approximately with a round cylindrical depression 12 of the axial inner end surface 14 of the axial outer end 16 of a chain sprocket 18, which sits firmly with pressure fitting, on one end 20 of a chain bolt 22, which projects by one end 20 of one end 24 of a shain socket 26, in which the bolt turns under friction fitting. The socket end 24 itself sits firmly with pressure fitting on the axially inner end 28 of another chain sprocket 30, which has an axially outward end surface 32 which forms, with the end surface 14, a ring gap 34 opening into the depression 12 and thus into the hollow space 10.

The depression 12 is limited axially outward by a flat, ring-form bottom surface 36, radially outward by a ring-form circumferential surface 40, coaxial with the axis 38 of the bolt 22, and radially inward by the bolt itself. The smaller hollow space 10 is also limited by the bottom surface 36 and the circumferential surface 40 and by the axially outer end surface 42 of the end of the socket 24, already lying in the depression 12, and by a round cylindrical distancing ring 44, which, on pressing the sprocket end 28 and the sprocket end 16 onto the end 24 of the socket and the end 20 of the bolt, respectively, takes a definite vertical distance between the surfaces 36 and 42, lying in parallel radial planes in relation to the axis 38.

In the examples of the preferred embodiment the seal, according to the subject invention, includes a statically sealing solid ring 50 of softer material, such as materials based on butadiene acrylonitrile rubber, and a dynamically sealing harder flange ring of more wear-resistant material, such as polyester urethane. The harder and softer materials are elastomers that are resistant to the lubricant oil located in the gap between the socket 26 and the bolt 22, and flows there from a central bore 46, oil-filled and stoppered at its ends, in the bolt, through at least one radial bore 48.

The solid ring 50 has, as suggested by its named, a massive cross-section of which the surface forms substantially a rectangle, and of which the longer axis runs axis-parallel. Three of the four surrounding corners of the solid ring 50 are each provided with a greater opening, resulting through beveling, while the radially and axially inner corner of the ring is only provided with a small phase. In the clamped condition, the solid ring 50 lies, by a wide sealing surface 54 against the bottom surface 36, and by most of its radially outward circumferential surface 56 and its axially inner end surface 58 against the flange ring 52 while it radially inner circumferential surface 60 does not touch the distancing ring 44.

The flange ring 52 has a profile approximately L-shaped in cross-section and has two flanges 62 and 64 of approximately rectangular cross-section, running perpendicular to each other. The narrow flange 62 lies, on the one hand, against the circumferential surface 56 of the solid ring 50 and, on the other hand, against the circumferential surface 40 of the depression 12, while in each case, a radial outer oversize of the relieved ring 50 and 52, respectively, provides for adhesive friction connection to the radial outer ring flange 62 and the cylindrical circumferential surface 40, respectively. The wider flange 64 has a ring groove 66, semicircular in cross-section, running around it, which (66) is covered by the end surface 42 of the bolt end 24, and divides the flat end surface 68 of the flange 64, lying against it into a radially inner partial surfaces 68.1 and a radially outer partial surface 68.2. The flange 64 keeps about the same radial distance from the distancing ring 44 as the solid ring 50, of which the longer axis is about tangent to the circular profile of the ring groove 66. Consequently, the radial width of the partial surface 68.2 is greater than that of the partial surface 68.1.

The flange of the flange ring 52 ends at such a distance from the bottom surface 36 that the solid ring 50, under axial pressure, can expand into interspace, and the said flange 62 in no case touches the bottom surface 36. The outer corner of the L-shaped flange ringe 52, formed by its two flanges 62 and 64 is provided with an opening 70, profiled according to the drawing, turned toward the ring gap 34, which (70) consists of a bevel 70.1 and a step 70.2, at righ angles to the end surface 68. In the partial volume of the hollow space 10, left free by the opening 70, dirt penetrating through the ring gap 34 can accumulate, which, in the worse case, arrives through the partial surface 68.2 into the ring groove 66, which serves as a reservoir for lubricant oil, which has made its way through the partial surface 68.1 in relation to which the end surface 42 of the socket end 24 rotates at intervals, while a relative movement between the surfaces 36 and 54 never takes place under any conditions. So far as corner openings and phasing have not been mentioned in the foregoing, it is generally to be noted that all edges of the solid ring 50 and especially of the flange ring 52 have been blunted by beveling or filling out, as the case may be.

I claim:

1. Seal for track chain links on tracked vehicles, in which four chain sprockets, arranged side-by-side in pairs and overlapping in pairs, as well as a chain socket solidly joining the ends of the sprockets lying axially within the overlapping zone, and a coaxial chain bolt solidly joining the chain members lying axially outside in the overlapping zone form a chain link which can be lubricated, from a bore in the bolt which can be filled with lubricant, through a radial bore in the bolt, while each sprocket lying axially outside, in the overlapping zone, has on its inner side a round cylindrical depression, to receive the seal, and a rigid distancing ring, sitting on the end of the bolt extending out of the socket, while the bottom surface of the depression, lying in one radial plane, lies opposite a sprocket next to the end surface of the dpression, lying in a parallel plane, and in which two overlapping sprockets form a ring gap, which opens the hollow space limited by the depression and the end surface lying axially opposite same; the seal, consisting of a softer solid ring, statically sealing against a boundary surface of the depression, and of a harder, more wear-resistant flange ring, which lies against the ring-form coaxial boundary surface of the depression, and dynamically seals against the end surface axially opposite the depression, with stress on the link, the flange ring supporting the solid ring both axially and radially, and between each of these rings, on the one hand, and the distancing ring, on the other hand, a distance is present, with the distinction that the solid ring is clamped axially between the bottom surface of the depression and a flange ring, lying against the sprocket end surface lying opposite the bottom surface, which lies broadly, by an end surface, divided by a ring groove running around the bolt, against the end surface of the sprocket, and that the solid ring is supported radially on the outside, by means of a flange ring, lying against the ring-form boundary surface of the depression, while the flange ring has a substantially L-shaped profile and a slight distance from the bottom surface of the depression, and occupies a pressure seating in the cylindrical boundary surface of the depression.

2. Seal according to claim 1 with the distinction that the profile of the solid ring is substantially a rectangle of which the longer axis runs axis-parallel.

3. Seal according to claim 1 or 2 with the distinction that the L-shaped flange ring at the outer corner formed by its two flanges is provided with an opening turned toward the ring gap.

4. Seal according to one of claims 1 to 3, with the distinction that the outer and inner corners of the solid ring and the flange ring are each beveled or filled out, as the case may be.

* * * * *

UNITED STATES PATENT AND TRADEMARK OFFICE
CERTIFICATE OF CORRECTION

PATENT NO. : 4,504,066

DATED : March 12, 1985

INVENTOR(S) : Ernst Hörl

It is certified that error appears in the above-identified patent and that said Letters Patent are hereby corrected as shown below:

On the title page:

Assignee:  Parker-Prädifa GmbH, Bietigheim-Bissingen

Signed and Sealed this

Thirty-first Day of December 1985

[SEAL]

Attest:

DONALD J. QUIGG

Attesting Officer

Commissioner of Patents and Trademarks